March 8, 1927. 1,620,461
R. J. HARRIS
FLYTRAP
Filed Jan. 23, 1926    2 Sheets-Sheet 1
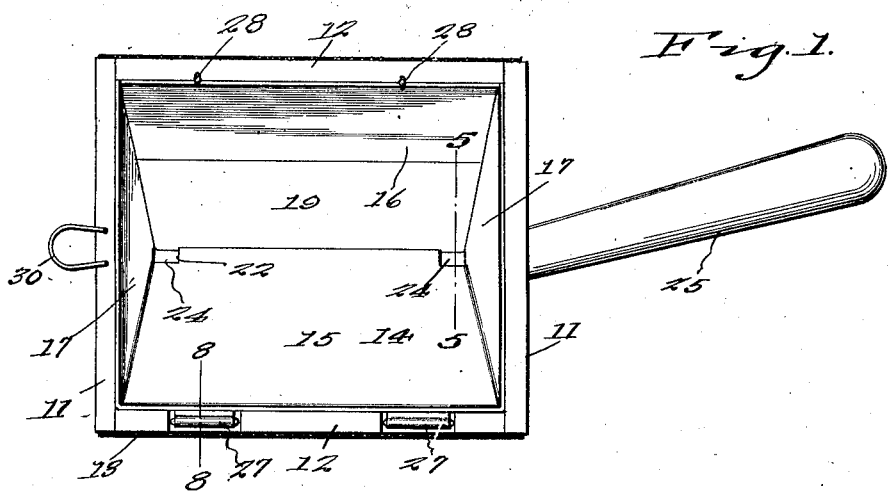
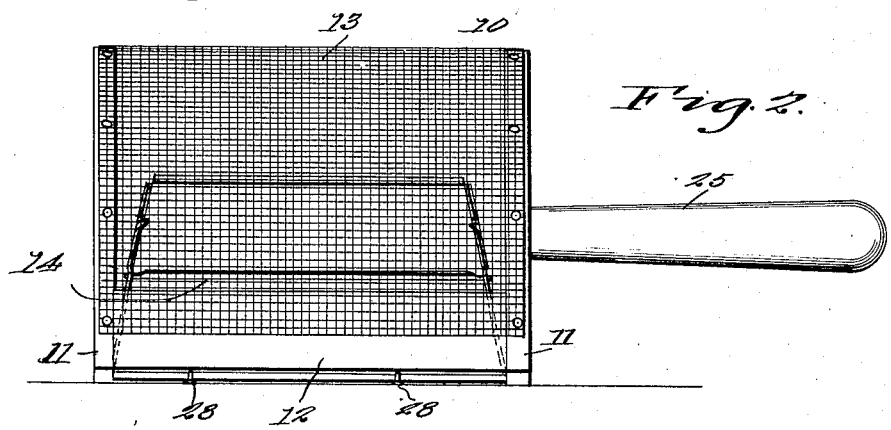
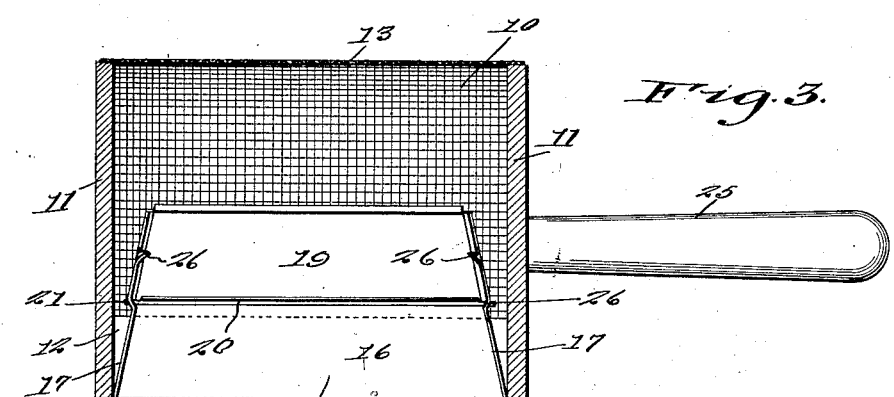
R. J. Harris INVENTOR
BY *Victor J. Evans*
ATTORNEY March 8, 1927.
R. J. HARRIS
FLYTRAP
Filed Jan. 23, 1926
1,620,461
2 Sheets-Sheet 2
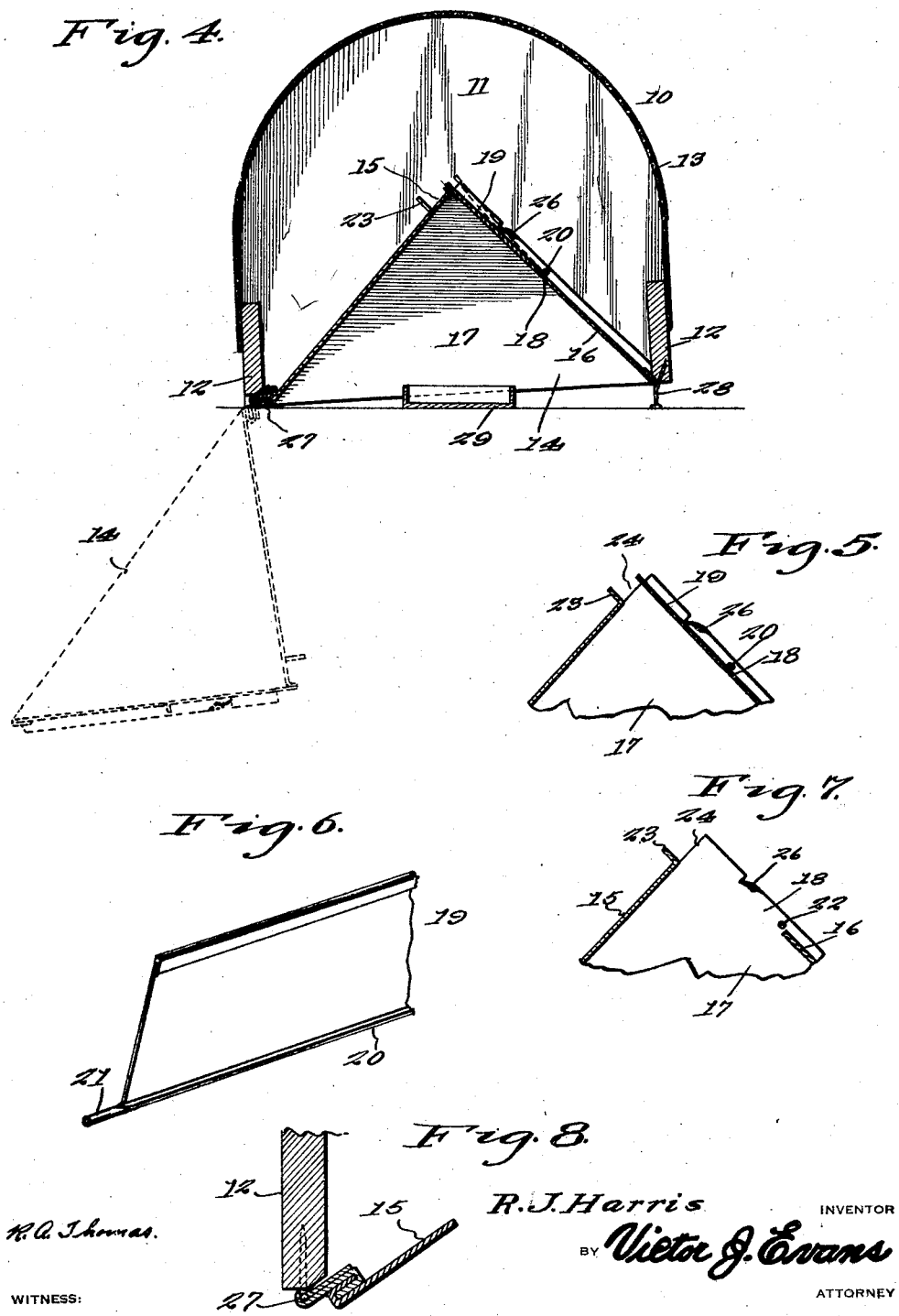

Patented Mar. 8, 1927.

1,620,461

UNITED STATES PATENT OFFICE.

RAYMOND J. HARRIS, OF HOUSTON, TEXAS.

FLYTRAP.

Application filed January 23, 1926. Serial No. 83,272.

This invention relates to insect traps especially designed for catching flies.

An object of the invention is the provision of a trap which may be either placed upon a support and baited to attract flies and insects, or swung through the air to force the insects into the trap.

Another object of the invention is the provsion of a trap which, when swung through the air will be automatically opened at the beginning of the stroke and automatically closed when the stroke is ended, so that insects may enter and thereafter be prevented from escaping.

Another object of the invention is the provision of a trap of the above character having an entrance passage of simple and novel construction and novel means to open and close said passage.

With the above and other objects in view, the invention further includes the following novel features and details of construction, to be hereinafter more fully described, illustrated in the accompanying drawings and pointed out in the appended claims.

In the drawings:—

Figure 1 is a front elevation of the trap.

Figure 2 is a side view.

Figure 3 is a longitudinal sectional view.

Figure 4 is a transverse section showing by dotted lines the trap in open position.

Figure 5 is a fragmentary sectional view on the line 5—5 of Figure 7.

Figure 6 is fragmentary perspective view of one end of the door of the trap.

Figure 7 is a view similar to Figure 5 with the door removed.

Figure 8 is a sectional view taken substantially on the line 8—8 of Figure 1.

Referring to the drawings in detail wherein like characters of reference denote corresponding parts, the trap as shown comprises a receptacle 10 which is made up of end walls 11 connected by bars 12. These walls 11 and bars 12 form a frame over which is secured a wall 13 preferably formed of woven wire. While the end walls 11 and beam 12 are shown as formed of wood, it is obvious that they may be made of metal of a materially reduced thickness.

The receptacle 10 is open at the front and extending inward from this opening is a member 14. This member comprises relatively inclined walls 15 and 16 which extend inward from opposite edges of the opening and which are connected by walls 17, also extending inward from the opening. The wall 16 is shorter than the wall 15 so as to provide an opening 18 at the inner end of the member 14. This member thus provides an entrance passage which is open at its outer and inner ends.

The opening 18 is designed to be closed by a door 19 and the latter is preferably formed of a metal plate having a flange 20 extending along one edge. The flange 20 reinforces the plate and is extended beyond the ends of said plate and rounded to provide pintles or trunnions 21, the latter being received within openings 22 provided in the opposite walls 17. The wall 15 is slitted from its inner edge so as to provide openings 22 which are offset from the opening 18, the material between the slits 22 being bent at an angle as shown at 23. Openings 24 are thus provided through which insects may enter when the door 19 is closed.

The receptacle is provided with a handle 25 which extends from one end thereof. This handle is preferably inclined with respect to the longitudinal center of the receptacle and provides convenient means for holding the trap so that the latter may be swung through the air when in use. When in use, the door 19 is in the position shown in Figure 1 of the drawings. At the beginning of the stroke, this door will be opened by the force of the trap passing through the air the open position of the trap being shown by dotted lines in Figure 4. Flies or other insects in the path of the trap will be directed through the passage into the receptacle and at the end of the stroke, the door 19 will be closed by gravity and the escape of the insects prevented. Opening movement of the door 19 is limited by substantially triangular shaped lugs 26 which are struck inwardly from the edges of the walls 17 as shown in Figures 3, 4, 5 and 7 of the drawings, the door engaging the inturned free corners of these lugs at the limit of its opening movement.

One edge of the wall 15 is hingedly secured to one of the beams 12 as shown at 27 so that the trap may be opened for the removal of the insects after the latter have been killed. Extending from the opposite beam 12 are retaining elements 28 of a suitable character. The elements shown are in the form of wire nails with which the outer edge of the wall 16 yieldingly engages so that the trap may be maintained in closed position, or opened as shown by the dotted lines in Figure 4. The elements 28 also serve as spacing elements so that the flat face of the trap may be positioned downward upon a suitable support and the edges thereof spaced above said support a sufficient distance to permit insects to pass beneath the trap and enter the latter through the openings 24. A bait pan 29 may be located beneath the trap.

The trap may also be provided with a hook or loop 30 whereby it may be conveniently hung upon a suitable hook or nail when not in use.

The invention is susceptible of various changes in its form, proportions and minor details of construction and the right is herein reserved to make such changes as properly fall within the scope of the appended claims.

Having described the invention what is claimed is:—

1. In combination, a fly trap comprising a receptacle having an opening therein, inclined walls extending inward from the edges of the opening and defining an entrance passage having an opening at its inner end, a pivotally mounted gravity closed door for the last mentioned opening and a handle extending from one end of the receptacle, whereby the trap may be swung horizontally to open the door.

2. A fly trap comprising a receptacle having an opening therein, inclined walls extending inward from the edges of the opening and defining an entrance passage having an opening at its inner end, a pivotally mounted gravity closed door for the last mentioned opening and a relatively small offset opening at the inner end of the entrance passage.

3. A fly trap comprising a receptacle having an opening therein, a member open at its opposite ends and having relatively inclined walls extending inwardly from the receptacle opening and defining an entrance passage, a gravity closed door for the inner end of the passage, means to hingedly connect one edge of said member at one edge of the opening of the receptacle and means to hold said member in position within said opening.

4. A fly trap comprising a receptacle having an entrance opening therein, a member open at its outer end and having relatively inclined walls extending inward from the receptacle opening, one of said walls being relatively short and providing an opening at the inner end of said member, said member defining an entrance passage into the receptacle and a section hinged at the inner edge of the short wall to provide a gravity closure for the opening.

5. A fly trap comprising a receptacle having an entrance opening therein, a member open at its outer end and having relatively inclined walls extending inward from the receptacle opening, one of said walls being relatively short and providing an opening at the inner end of said member, said member defining an entrance passage into the receptacle and a section hinged at the inner edge of the short wall to provide a gravity closure for the opening and the long wall of the entrance passage being slitted from its inner edge to provide a relatively small entrance opening.

6. A fly trap comprising a receptacle having a flat face and an opening in said face, inwardly inclined walls extending from the edges of the opening and defining an entrance passage, an opening at the inner end of said passage and means extending from one edge of the face of said receptacle to space the latter upward from a support.

7. A fly trap comprising a receptacle having a flat face and an opening in said face, inclined walls hingedly secured to and extending inward from the edges of the opening and defining an entrance passage, an opening at the inner end of said passage and means extending from one edge of the face of said receptacle to space the latter upward from a support and to hold the inclined walls in place.

In testimony whereof I affix my signature.

RAYMOND J. HARRIS.